US008694974B2

(12) United States Patent
Krishnaswamy

(10) Patent No.: US 8,694,974 B2
(45) Date of Patent: Apr. 8, 2014

(54) LOAD-CHECKING ATOMIC SECTION

(75) Inventor: Arvind Krishnaswamy, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1327 days.

(21) Appl. No.: 12/432,635

(22) Filed: Apr. 29, 2009

(65) Prior Publication Data

US 2010/0281465 A1 Nov. 4, 2010

(51) Int. Cl.
*G06F 9/45* (2006.01)

(52) U.S. Cl.
USPC ........... 717/140; 717/141; 717/145; 717/151; 717/152; 717/154

(58) Field of Classification Search
USPC ............................ 717/140–145; 712/225, 217
See application file for complete search history.

(56) References Cited

U.S. PATENT DOCUMENTS

| 5,673,426 A | 9/1997 | Shen |
| 5,928,334 A | 7/1999 | Mandyam |
| 6,285,974 B1 | 9/2001 | Mandyam |
| 6,681,317 B1 * | 1/2004 | Mathews ................... 712/203 |
| 6,799,236 B1 | 9/2004 | Dice |
| 6,934,832 B1 | 8/2005 | Van Dyke |
| 7,047,394 B1 | 5/2006 | Van Dyke |
| 7,065,633 B1 | 6/2006 | Yates, Jr. |
| 7,178,062 B1 | 2/2007 | Dice |
| 2002/0083278 A1 * | 6/2002 | Noyes ........................ 711/156 |
| 2004/0168045 A1 * | 8/2004 | Morris et al. ................ 712/225 |
| 2005/0114632 A1 * | 5/2005 | Kottapalli .................... 712/225 |
| 2005/0283780 A1 * | 12/2005 | Karp et al. ................... 718/100 |
| 2008/0276025 A1 * | 11/2008 | Cherem et al. ............... 710/200 |

OTHER PUBLICATIONS

Cherem et al., Inferring Locks for Atomic Sections, Microsoft Research Work, Jun. 2008.*

* cited by examiner

*Primary Examiner* — Lewis A Bullock, Jr.
*Assistant Examiner* — Tina Huynh

(57) ABSTRACT

A compiled program has an advanced-load instruction and a load-checking atomic section. The load-checking atomic section follows the advanced-load instruction in the compiled program. The advanced-load instruction, when executed, loads a value from a shared memory address. The load-checking atomic section includes a check instruction for checking the validity of the shared memory address.

15 Claims, 3 Drawing Sheets

LOAD-CHECKING ATOMIC SECTION

BACKGROUND

Herein, related art is described to facilitate understanding of the invention. Related art labeled "prior art", if any, is admitted prior art; related art not labeled "prior art" is not admitted prior art.

Generally, computer programs have a logical order in which their instructions are to be executed to produce the desired result. However, in many cases, greater performance can be achieved by executing instructions out-of-order, e.g., by speculatively executing time-consuming instructions ahead of their logical order so that the results are available earlier. On shared-memory multiprocessor architectures, program performance can be further improved by executing multiple tasks concurrently on multiple processor cores.

Out-of-order execution can work as long as the results are the same as they would have been if the logical order had been adhered to. For example, a program thread might include a load instruction to load a value from a memory location into a processor register. If that load instruction has been advanced, there will be a time interval between the time the load instruction is executed and the time the load instruction would have been executed if the logical order had been adhered to. If, during that interval, another thread has changed the contents of the memory location, the out-of-order load instruction may have loaded the wrong value.

There are two basic approaches to addressing potential errors due to out-of-order instructions that are speculatively executed: 1) preventing them, and 2) detecting and correcting for them. In the latter case, an advanced-load address table (ALAT) or a comparable mechanism can be used to keep track of addresses accessed by an advanced load. In the event of an intervening store operation to the load address, a table entry corresponding to the previously executed advanced-load instruction is marked "invalid". When a check instruction (e.g., at the logical-order position for the load instruction) detects an invalidated entry, the correct value can be loaded.

The challenge for concurrent execution on shared-memory architectures is to ensure concurrent tasks do not introduce data races by modifying a shared memory location concurrently. To prevent such data races from producing incorrect results, some processor architectures permit sections of a program to be executed "atomically". More specifically, a section of code that would otherwise be vulnerable to interference by another thread can be given exclusive access to some memory locations until execution of the section is completed. For example, if two threads store to that same location, the section of code in each of the threads trying to access the memory location should be contained within atomic sections; this ensures that each thread has exclusive access when it tries to store to that memory location.

Parallel programs are written using a high-level or low-level programming language with atomic sections to prevent such data races. Alternatively, they can also be generated automatically using a parallelizing compiler for instance. Atomic sections are treated as black boxes by the compiler from a code reordering perspective. In general, instructions inside the atomic section which access shared data cannot be moved outside the atomic section without introducing data races.

DETAILED DESCRIPTION

The present invention provides for speculatively shrinking atomic sections at compile time to improve the performance of lock-based parallel programs. For example, a program may be programmed to have threads with atomic sections or the atomic sections can result from a compilation phase. In either case, a subsequent compilation phase can speculatively advance "load" instructions that access shared memory locations and other instructions that use the value loaded from memory by the load instruction out of the atomic sections.

Stores to shared memory locations remain within atomic sections, while check instructions are added to atomic sections to correct load errors due to concurrent stores to the same memory location by other threads. By ensuring that check instructions and stores to shared locations stay within the atomic sections, this compiler transformation allows multi-threaded operation without deviating from the logically mandated results. Thus, the described compile-time shrinkage of atomic sections allows: a) advanced instructions to executed concurrently; b) locks to be held for much shorter time intervals, reducing lock contention; and c) ease of programmability by letting the programmer define large atomic sections without having to worry about performance. Introducing such lock elision using a compiler transformation allows one to apply this transformation selectively to the atomic sections that matter in an easily deployable fashion.

Figure 1:
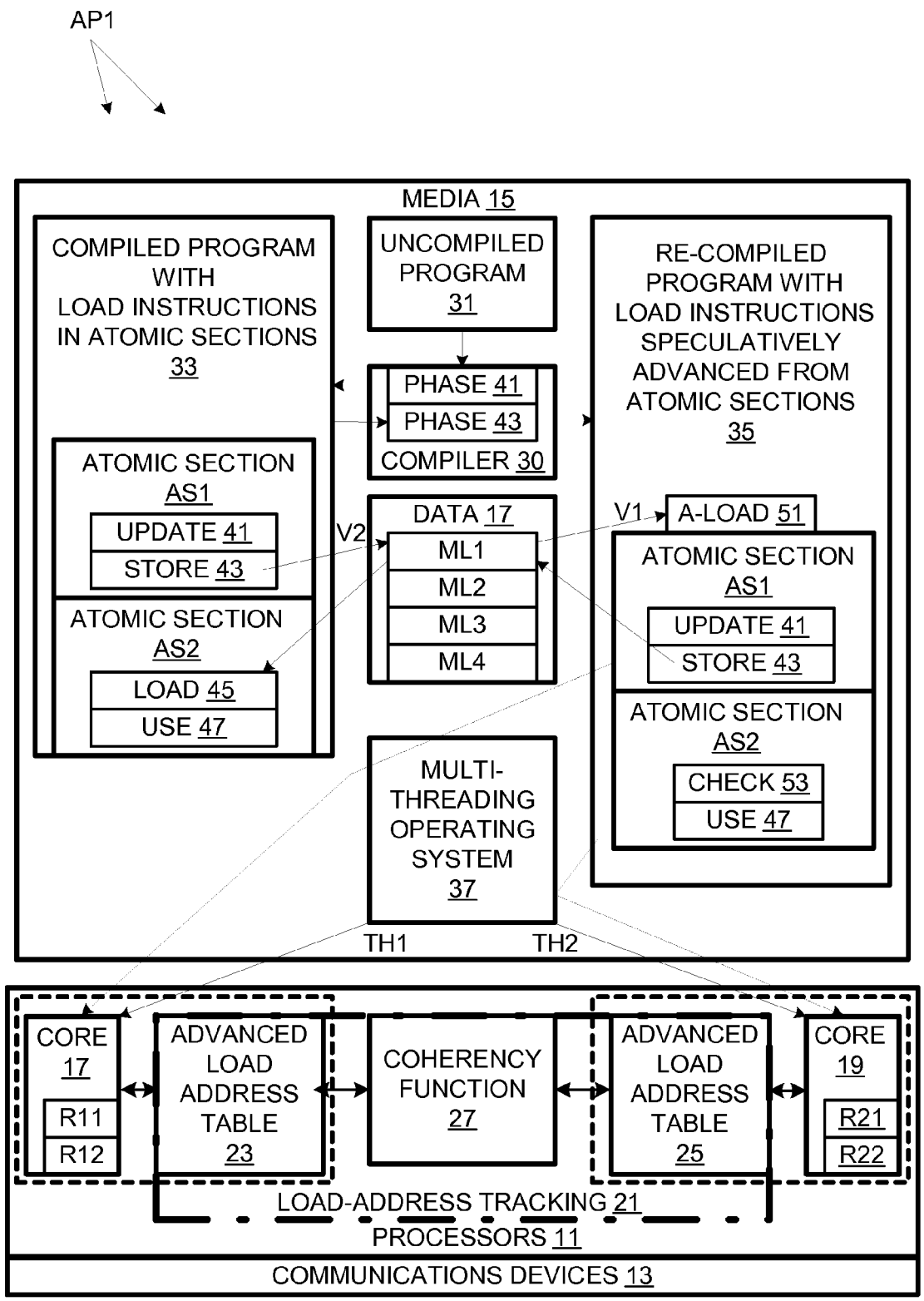
FIG. 1 is a schematic view of a system in accordance with an embodiment of the invention.

In the embodiment of the invention shown in FIG. 1, a computer system API includes processors 11, communications devices 13, and non-transitory computer-readable storage media 15. Processors 11 can include single-core processors, dual-core processors, and processors with three or more cores. Communications devices 13 can include one or more input devices and interfaces, output devices and interfaces, and network interfaces. Media 15 can include main memory, hard disks (local and SAN), removable memory, etc. Processors 11 provide cores 17 and 19, as well as a load-address tracking function 21. Core 17 includes registers, e.g., registers R11 and R12; core 19 includes registers, e.g., registers R21 and R22. Load-address tracking function 21 provides an ALAT 23 associated with core 17 and an ALAT 25 associated with core 19. A coherency function 27 ensures coherency among ALATs, e.g., between ALATs 23 and 25. Note, although shown separately from their respective cores in FIG. 1, ALATs are normally considered part of their respective cores.

Media 15 is tangibly encoded with code including data and instructions. The instructions are arranged into programs including a compiler 30, an uncompiled program 31, a "compiled" program 33, a "recompiled" compiled program 35, and a multi-threading operating system 37. Compiler 30 provides for compiling phases 41 and 43. Media 15 defines memory locations ML1-ML4, which contain words of data 17.

Compiler 30, in phase 41, converts uncompiled program 31 into compiled program 33. Compiled program 33 includes atomic sections AS1 and AS2, which are assigned to threads TH1 and TH2. In the context of compiled program 33 of FIG. 1, atomic sections AS1 and AS2 are to be executed while TH1 and TH2 are executed. Atomic section AS1 includes an update sequence 41 and a store instruction 43. Atomic section AS2 includes a load instruction 45 and a use sequence 47 using the value loaded. In one scenario, load instruction 45 is intended to load a value stored by instruction 43 in memory location ML1.

Use sequence 47 cannot be executed until load instruction 45 is completed. However, load instruction 45 involves a time-consuming memory access and so can impose a performance cost. In phase 43, compiler 30 alleviates this cost by advancing load instruction 45 ahead of atomic sections AS2 to yield load instruction 51 of recompiled program 35. Atomic section AS1 is unchanged, but in atomic section AS2, load instruction 45 has been replaced by a check instruction 53.

Load instruction 51 is an "advanced" load instruction. When an advanced-load instruction is executed on system AP1, load address tracking function 21 tracks the shared memory address. More specifically when load instruction 51 is executed by core 19, the shared memory address (ML1) and the destination register are entered into ALAT table 25. In contrast, load instruction 45 is a normal load instruction; it is not tracked and no entry is made to any ALAT by virtue of its execution.

While program 35 is executing, multi-threaded operating system 37 directs thread TH1, and hence advanced-load instruction 51, to core 19. When executed, load instruction 51 loads the value in memory location ML1 into a register R21 as specified by load instruction 51. In the meantime, operating system 37 routes thread TH2, and hence atomic section AS1 to core 17. When executed, update sequence 41 calculates a value V2 and stores it in register R12; store instruction 43 stores value V2 at memory location ML1. In the meantime, thread TH2 stalls until AS1 completes its execution releasing the lock allowing TH2 to enter its atomic section AS2.

If program 33 were executed, value V2 is the value that would have been loaded by load instruction 45 and used by use sequence 47. However, in one scenario, load instruction 51 loads from memory location ML1 before it is updated by update sequence 41. Thus, load instruction 51 loads the wrong value (V1) into register R21.

When atomic section AS1 is executed, e.g., by core 19, each store-to address is checked against the shared memory addresses in ALAT 23. In addition, the store-to address is distributed by coherency function 27 so that it is checked against other ALATs including ALAT 25. When the store-to address is checked against the shared memory addresses in ALAT 25, a "hit" occurs since the store-to address for instruction 43 is the same as the shared memory address of load instruction 51. In response to that hit, the load-to address entry in ALAT 25 is marked "invalid".

When core 19 executes atomic section AS2, check instruction 53 checks the status of the load-to entry for instruction 51. If the entry is invalid, the check instruction will cause a recovery routine to be executed. The result is that a new load instruction is executed so as to transfer value V2 to register R21.

If, as in an alternative scenario, the load-to address was not marked invalid, the check instruction would function as a no-operation (no-op) and core 19 would continue with execution of use sequence 47. This scenario would occur if no intervening (between load 51 and check 53) store instruction in any thread wrote to memory location ML1.

Figure 2:
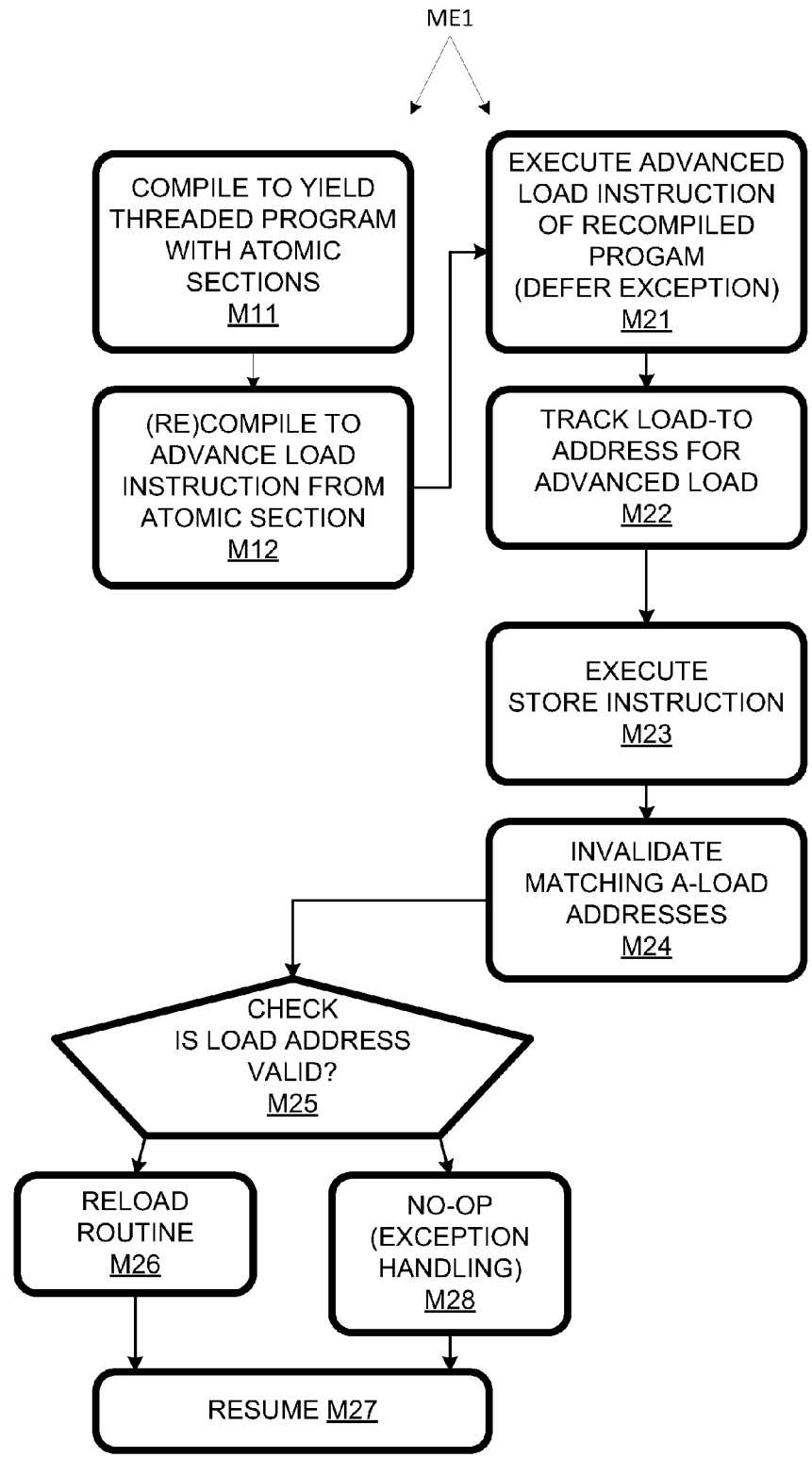
FIG. 2 is a flow chart of a method in accordance with an embodiment of the invention.

System AP1 provides for a method ME1, flow charted in FIG. 2. At method segment M11, a program can be compiled to yield a threaded program with atomic sections. This method segment corresponds to phase 41 implemented by compiler 30 (FIG. 1). The source program can be an uncompiled program or a program in an earlier stage of a multi-stage compile process. The atomic sections can include load instructions, typically "normal" load instructions as opposed to "advanced" load instructions, e.g., without corresponding "check" instructions.

At method segment M12, the program is recompiled, e.g., during phase 43 as implemented by compiler 30 (FIG. 1). As a result of this recompilation phase 43, normal load instructions are removed from atomic sections and corresponding advanced-load instructions are added in front of the respective atomic sections. In other words, load instructions in atomic sections are advanced out of and ahead of the atomic sections to which they belong; in the process, they are converted to advanced-load instructions.

Execution of the recompiled program begins at method segment M21, which involves executing an advanced-load instruction. As with a normal load instruction, this involves transferring a value stored in a main memory location to a processor register. If the main memory location is represented in a cache, the value can be loaded from the cache instead of main memory.

Executing an advanced-load instruction involves providing for tracking the load instruction to confirm or disconfirm its validity at method segment M22. Tracking can be provided for by storing the shared memory address of an advanced-load instruction in the ALAT for the core executing the advanced-load instruction.

In the course of executing additional instructions, store instructions can be executed at method segment M23. There can be one or many of such store instructions. These can be in the same thread and executed by the same core as the advanced-load instruction or they can belong to a different thread and be executed on a different core.

The store-to address for each store instruction that might address the shared memory address of an advanced-load instruction is compared to the shared memory addresses in the local ALAT as well as other ALATs. Thus, the store-to address for each executing store instruction is compared to the shared memory address for a pending (executed and not yet checked) advanced-load instruction. In the event of a match between a shared memory address and a store-to address, the shared memory address is marked "invalid" in the ALAT storing the shared memory address.

Execution of the atomic section that contained the load instruction advanced in method segment M12 begins at method segment M25. In the course of executing the atomic section, a check instruction corresponding to the advanced load is executed. The check instruction checks the local ALAT to determine whether the load-to address has been marked "invalid" or not. If it has been marked "invalid", the check instruction calls a recovery or "re-load" routine at method segment M26; the recovery routine can involve executing original (non-advanced) load instruction 45. The recovery routine provides the correct load value according to the logical order of the original program. The recompiled program can then resume execution at method segment M27. For example, after a recovery routine called by check instruction 53 (FIG. 1) is run, execution of use sequence 47 can begin.

Advancing load instructions out of atomic sections provides performance advantages when the vast majority of advanced loads turn out to be valid when checked. In this case, a check instruction can act as a no-op as at method segment M28, with method ME1 resuming at M27. Whether or not the ALAT indicates the load instruction is valid, the check instruction removes at method segment M25 the checked shared memory address from the ALAT so that it is no longer pending.

In a variation of method ME1, the advanced-load instruction is a "speculative advanced-load" instruction. Herein, a "speculative advanced" load differs from a normal "advanced" load in how exceptions are handled. A non-speculative advanced-load instruction handles an exception immediately, while a speculative advanced load defers exception handling until a check instruction validates the speculative advanced load. The speculative advanced load avoids an unnecessary time-consuming exception handling routine in the case an excepting instruction turns out to be invalid.

Figure 3:
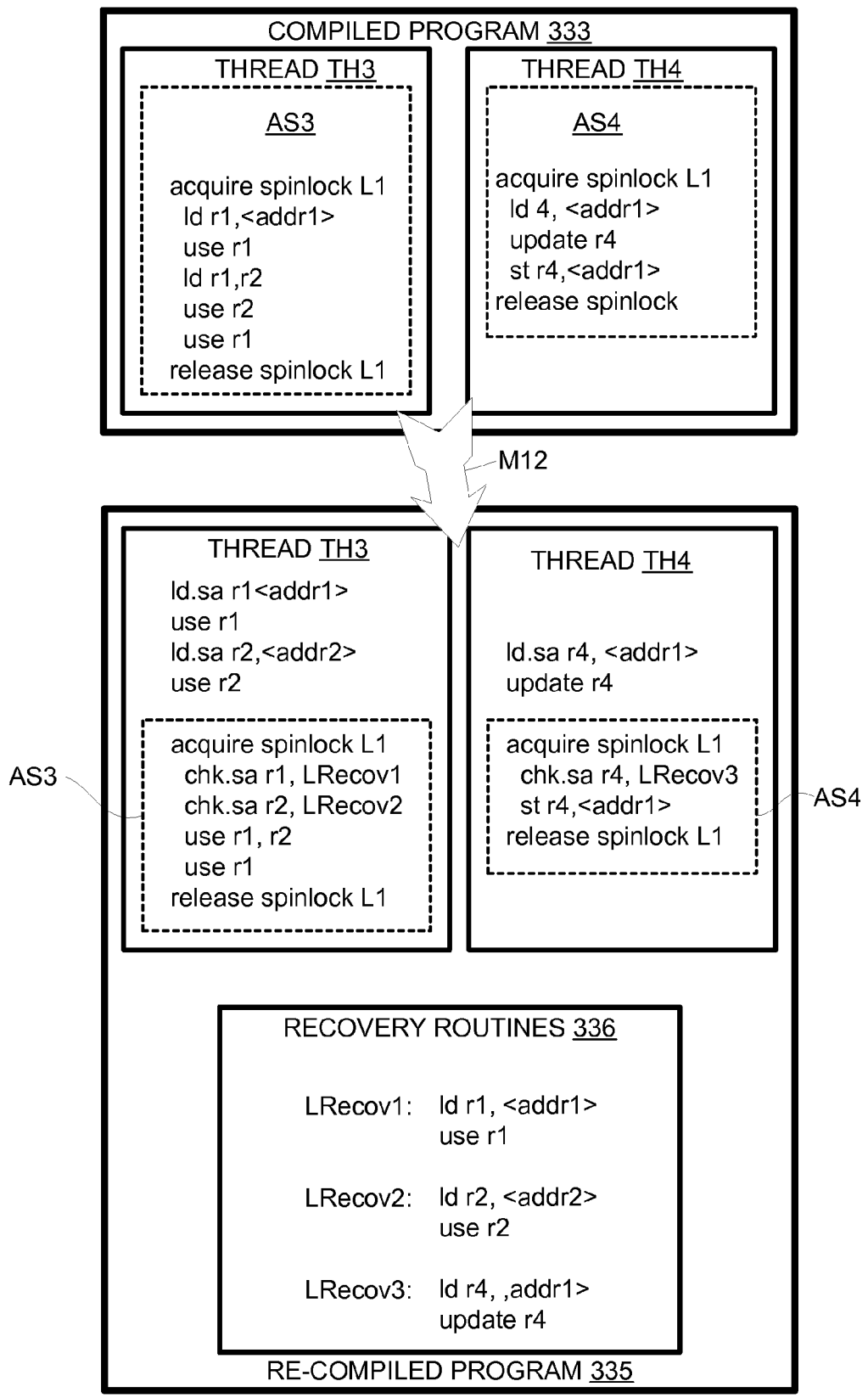
FIG. 3 is a pseudo-code presentation of an example of a portion of a program before and after a phase of compilation.

A pseudo-code example for compilation method segment M12 is shown in FIG. 3. Method segment M12 converts compiled program 333 to recompiled program 335. Acquire and release "spinlock" instructions mark atomic sections AS3 and AS4 of threads TH3 and TH4, respectively. "ld" and "st" are normal load and store instructions. "ld.sa" is a speculative advanced-load instruction. "use" and "update" correspond to use and update sequences, respectively. "chk.sa" corresponds to check instructions (for speculative advanced-load instructions) performed at method segment M25 of FIG. 2. The check instructions call "LRecov" routines run at method segment M26 of FIG. 2. "<addr1>", etc., represent memory locations, while r1, etc., represent register locations.

As exemplified in FIG. 3, method ME1 provides for more than just moving load instructions out of atomic sections. For example, method segment M12 moves sequence "use r1" along with instruction ld r1 out of atomic section AS3. "use r1" is a sequence of instruction that is intended to perform computations based on the value loaded into register r1 by load instruction ld r1. If the post compilation advanced-load instruction ld.sa r1 <addr1> turns out to be invalid, use r1 will also yield an invalid result. This is why LRecov1 (of recovery routines 336) re-executes use r1 once the non-advanced load ld r1 is executed.

Herein, a section of a thread is "atomic" if it includes plural instructions and an indication that other threads are to be prohibited from accessing a memory location accessed by said section while said section is being executed. Herein, an instruction is a "load instruction" if it transfers a value from a memory location to a processor register, regardless of the name of the instruction or what else it accomplishes. Thus, for example, a "compare-and-exchange" instruction qualifies as a "load" instruction herein. Herein, a load instruction is "advanced" if there is a subsequent check instruction that checks if the load instruction is still valid when the check instruction is executed. All programs and instructions herein are encoded in computer-readable storage media and physically transform such media when executed.

A program can provide an atomic section either by including an atomic section or generating or converting an atomic section in another program. Alternative embodiments use different instructions and mechanisms for handling advanced loads and speculative advanced loads. The compiling and executing can occur on the same or different computers. Cores can share an ALAT or have their own ALATs, which are coordinated. These and other variations upon and modifications to the illustrated embodiments are provided for by the present invention, the scope of which is defined by the following claims.

What is claimed is:

1. A method comprising steps of executing a compiled program having a loading atomic section including a non-advanced-load instruction stored on a non-transitory computer-readable storage media, the steps comprising:
   executing an advanced-load instruction that, accesses a shared memory address and loads a value therefrom, said advanced-load instruction corresponding to said non-advanced-load instruction;
   executing a load-checking atomic section including a check instruction that performs the steps of:
      checks whether or not said advanced-load instruction loaded a correct value when said advanced-load instruction was executed by determining whether the shared memory address accessed by the advanced-load instruction, when it was executed, was valid or invalid, wherein the shared memory address is represented by a respective entry in an advanced-load address table, and
      in the event the shared memory address is determined to have been invalid, calling for said non-advanced-load instruction to be executed, said load-checking atomic section following said advanced-load instruction in said compiled program, said loading atomic section not including said check instruction.

2. A method as recited in claim 1 further comprising executing said advanced-load instruction so as to cause said shared memory address to be represented by a respective entry in said advanced-load address table.

3. A method as recited in claim 2 wherein said compiled program includes:
   a first thread including said load-checking atomic section and said advanced-load instruction; and
   a second thread including a second atomic section and store instruction to said shared memory address.

4. A method as recited in claim 3 further comprising executing said store instruction while said shared memory address is represented in said advanced-load address table by said respective entry so as to cause said entry to be marked invalid.

5. A method as recited in claim 4 further comprising executing said check instruction so as to determine whether or not said entry is invalid, said check instruction calling a recovery routine including said non-advanced-load instruction in response to a determination that said shared memory address is invalid.

6. A method as recited in claim 2 further comprising executing said check instruction so as to remove said entry from said advanced-load address table.

7. A system comprising non-transitory computer-readable storage media encoded with a program including:
   an advanced-load instruction that, when executed, loads a value from a shared memory address; and
   a load-checking atomic section including a check instruction that, when executed,
      checks whether or not said advanced-load instruction loaded a correct value when said advanced-load instruction was executed by determining whether the shared memory address accessed by the advanced-load instruction, when it was executed was valid or invalid, wherein the shared memory address is represented by a respective entry in an advanced-load address table, and
      in the event that the shared memory address is determined to have been invalid, calling for a non-advanced-load-instruction to be executed, said load-checking atomic section not including said advanced-load instruction.

8. A system as recited in claim 7 wherein said program is a compiler that converts a first program having first a non-load-checking atomic section including said non-advanced-load instruction into a second program in which said advanced-load instruction precedes said load-checking atomic section.

9. A system as recited in claim 8 including at least one processor for executing said compiler.

10. A system as recited in claim 8 wherein, if, when said check instruction is executed, said shared memory address is determined to be invalid, said check instruction calls for a second non-advanced-load instruction to be executed.

11. A system as recited in claim 7 wherein said check instruction, when executed, causes said shared memory address to be removed from said advanced load-address table.

12. A system as recited in claim 11 further comprising a first processor core for executing said program, said first processor core including said advanced-load address table for storing said shared memory address associated with said advanced-load instruction upon execution of said advanced-load instruction.

13. A system as recited in claim 12 further comprising:
a second processor core for executing a store instruction; and
a coherency function for marking said shared memory address in said advanced-load address table invalid a case in which a store-to address of said store instruction matches said shared memory address while said advanced-load instruction is represented in said advanced-load address table.

14. A system as recited in claim 12 wherein, if, when said check instruction is executed by said first processor core, said shared memory address is determined to be invalid, said check instruction calls for said non-advanced-load instruction to be executed.

15. A system as recited in claim 12 wherein said check instruction, when executed, causes said shared memory address to be removed from said advanced-load address table so that said shared memory address is no longer represented in said advanced-load address table.

* * * * *

UNITED STATES PATENT AND TRADEMARK OFFICE
CERTIFICATE OF CORRECTION

PATENT NO. : 8,694,974 B2  
APPLICATION NO. : 12/432635  
DATED : April 8, 2014  
INVENTOR(S) : Arvind Krishnaswamy Page 1 of 1

It is certified that error appears in the above-identified patent and that said Letters Patent is hereby corrected as shown below:

In the Claims

In column 6, line 54, in Claim 7, delete "executed" and insert -- executed, --, therefor.

In column 6, line 64, in Claim 8, delete "first a" and insert -- a first --, therefor.

In column 7, line 9, in Claim 11, delete "advanced load" and insert -- advanced-load --, therefor.

In column 8, line 2, in Claim 13, delete "invalid" and insert -- invalid in --, therefor.

Signed and Sealed this  
Second Day of September, 2014

Michelle K. Lee  
*Deputy Director of the United States Patent and Trademark Office*